(12) United States Patent
Sahoo et al.

(10) Patent No.: US 12,366,973 B1
(45) Date of Patent: Jul. 22, 2025

(54) RELIABLE NON-VOLATILE MEMORY DOWNLOAD APPROACH

(71) Applicant: STMicroelectronics International N.V., Geneva (CH)

(72) Inventors: Naren Kumar Sahoo, Frisco, TX (US); Pavan Nallamothu, Little Elm, TX (US); Christiana Kapatsori, Chicago, IL (US); Yamu Hu, Allen, TX (US); David McClure, Carrollton, TX (US)

(73) Assignee: STMicroelectronics International N.V., Geneva (CH)

( * ) Notice: Subject to any disclaimer, the term of this patent is extended or adjusted under 35 U.S.C. 154(b) by 14 days.

(21) Appl. No.: 18/415,964

(22) Filed: Jan. 18, 2024

(51) Int. Cl.
*G06F 3/06* (2006.01)

(52) U.S. Cl.
CPC .......... *G06F 3/0619* (2013.01); *G06F 3/0658* (2013.01); *G06F 3/0673* (2013.01)

(58) Field of Classification Search
CPC ..... G06F 3/0619; G06F 3/0658; G06F 3/0673
See application file for complete search history.

(56) References Cited

U.S. PATENT DOCUMENTS

| | | | |
|---|---|---|---|
| 7,571,379 B2 | 8/2009 | Bombaci et al. | |
| 9,190,988 B1 * | 11/2015 | Gupta | H03K 3/012 |
| 9,683,904 B2 | 6/2017 | Matsumoto | |
| 11,195,571 B2 | 12/2021 | Eom | |
| 11,397,669 B2 | 7/2022 | Chung | |
| 11,581,027 B2 | 2/2023 | Shih | |
| 11,593,489 B2 | 2/2023 | Shi | |
| 11,823,755 B2 | 11/2023 | Mondello | |
| 2009/0021985 A1 * | 1/2009 | Byeon | G11C 16/30 365/225.7 |
| 2009/0154250 A1 * | 6/2009 | Lin | G11C 16/20 365/185.22 |
| 2016/0350164 A1 * | 12/2016 | Cunningham | G11C 16/3418 |
| 2018/0074532 A1 * | 3/2018 | Mandal | G05F 3/30 |
| 2023/0049928 A1 | 2/2023 | Yun | |

* cited by examiner

*Primary Examiner* — Jason W Blust
(74) *Attorney, Agent, or Firm* — Slater Matsil, LLP (57) ABSTRACT

According to an embodiment, a method includes adjusting a reference generator into a first configuration based on a temporary trim value resulting, in a first reference voltage and a first reference current being generated for a first memory. The method further includes performing an integrity check on an initial set of data downloaded from the first memory based on the first reference voltage and the first reference current. The initial set of data includes a first trim value. The method further includes downloading contents from the first memory into a second memory in response to a successful integrity check after adjusting the reference generator into a second configuration. In the second configuration, the reference generator generates a second reference voltage and a second reference current for the first memory. The reference generator is adjusted by the first trim value in response to a successful integrity check.

20 Claims, 5 Drawing Sheets

RELIABLE NON-VOLATILE MEMORY DOWNLOAD APPROACH

TECHNICAL FIELD

The present disclosure generally relates to memory and, in particular embodiments, to downloading data from memory.

BACKGROUND

Application-Specific Integrated Circuits (ASICs) that use One-Time Programmable (OTP) Memory or Non-Volatile Memory (NVM), like Flash memory, allow devices to store data permanently. This means the data remains intact even after power is removed from the device. This is primarily used for storing device-specific calibration data, firmware code, security keys, or user settings.

This kind of memory involves transferring or downloading data from the OTP or NVM to a local, volatile memory (such as SRAM-Static Random Access Memory) in the ASIC. This enables faster and more efficient access to the data, as accessing data directly from non-volatile memory can be slower and consume more power.

Upon powering on or being triggered by a specific event, the ASIC kickstarts a procedure to copy the data retained in the OTP or NVM. This data is subsequently transferred or "downloaded" into ASIC's local volatile memory. Once the data is securely lodged in the local memory, the ASIC can use it. This could be for various functions, such as driving a display, executing a communication protocol, or computing. The precise procedure can have variations depending on the unique design and structure of the ASIC.

The precise functioning of memory-related processes in ASICs relies heavily on the control of voltage and current levels. This is especially true for downloading data from the OTP or NVM to the local volatile memory. A consistent and precise reference voltage and current supply is crucial before the correct reference trim values are downloaded onto the system. This requirement is due to the influence of voltage and current levels on the stability and reliability of memory download processes.

Maintaining an accurate download becomes more complex in environments where process parameters, voltage, and temperature vary. If these variables fall outside their specified ranges, they could interfere with the memory operations. For instance, high or low voltage levels can cause read or write errors, while temperature changes can affect the resistance of the components, indirectly impacting voltage and current levels.

Thus, it is desirable to have a reliable and fast approach for accurately tuning reference values within the specified limits to ensure correct data transfer amidst variations in process parameters, voltage, and temperature.

SUMMARY

Technical advantages are generally achieved by embodiments of this disclosure, which describes downloading data from memory.

A first aspect relates to a method that includes adjusting, by a controller, a reference generator into a first configuration, wherein, in the first configuration, the reference generator is configured to generate a first reference voltage and a first reference current for a first memory, the reference generator adjusted by a temporary trim value in the first configuration; performing, by the controller, a download integrity check on an initial set of data downloaded from the first memory based on the first reference voltage and the first reference current, the initial set of data comprising a first trim value; and downloading, by the controller, contents from the first memory into a second memory in response to a successful download integrity check after adjusting the reference generator into a second configuration, wherein, in the second configuration, the reference generator is configured to generate a second reference voltage and a second reference current for the first memory, the reference generator adjusted by the first trim value in response to a successful download integrity check.

A second aspect relates to a circuit. The circuit includes a reference generator configured to generate a reference voltage and a reference current, wherein the reference voltage, the reference current, or both are adjustable based on a trim value; a first memory configured to store a first trim value for the reference generator in an initial set of data; a second memory; and a controller configured to: determine a temporary trim value to be forwarded to the reference generator; perform a download integrity check on the initial set of data downloaded from the first memory based on a first reference voltage and a first reference current provided by the reference generator after being adjusted based on the temporary trim value; and download a second set of data from the first memory to the second memory based on a second reference voltage and a second reference current provided by the reference generator after being adjusted based on the first trim value in response to a successful download integrity check.

A third aspect relates to a device. The device includes a processor; and a circuit comprising: a reference generator configured to generate a reference voltage and a reference current, wherein the reference voltage, the reference current, or both are adjustable based on a trim value; a first memory configured to store a first trim value for the reference generator in an initial set of data; a second memory accessible by the processor; and a controller configured to: determine a temporary trim value to be forwarded to the reference generator; perform a download integrity check on the initial set of data downloaded from the first memory based on a first reference voltage and a first reference current provided by the reference generator after being adjusted based on the temporary trim value; and download a second set of data from the first memory to the second memory based on a second reference voltage and a second reference current provided by the reference generator after being adjusted based on the first trim value in response to a successful download integrity check.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of memory downloads in an Application-Specific Integrated Circuit (ASIC), it should also be appreciated that these inventive aspects may also apply to other memory-related applications. In particular, aspects of this disclosure may similarly apply to the transfer of memory from one location to another or for direct use by the ASIC or any other generic controller from non-volatile memory.

Conventionally, the issue of maintaining reference values for data download from non-volatile memory to the local memory within the stipulated limits amidst variable processes, voltage, and temperature requirements has been addressed using a dedicated reference block. This block generates and maintains high-precision references across altering process parameters and temperatures. The benefit of this solution lies in its ability to produce a very accurate reference irrespective of environmental conditions. However, this conventional solution is not without drawbacks. It often requires a complex auto-zeroing method to ensure the precision of the reference. Auto-zeroing is a technique used to eliminate offset errors in amplifiers, which can affect the accuracy of the reference block. The complexity of the auto-zeroing method can contribute to an increase in the area of the ASIC since more circuitry is required to implement it. Either additional components are required, or existing components must be more complex, leading to a larger physical size for the ASIC. This can be a significant downside, particularly today, where compact and efficient design is paramount. Additionally, incorporating a complex auto-zeroing method could translate to a longer startup time for the ASIC. As auto-zeroing is usually performed at startup, the more complex the method, the longer it can take for the ASIC to be ready for operation. This additional time can be a significant disadvantage in rapid startup scenarios, such as in many modern electronic devices.

Therefore, while a dedicated reference block with a complex auto-zeroing technique can provide high-precision references, it may add to the device's area requirements and startup time, presenting challenges in specific applications. Embodiments of this disclosure propose an improved method, circuit, and system that can deliver the desired accuracy without these drawbacks.

Aspects of this disclosure disclose pre-coded analog reference trims that are stepped through by a digital Finite State Machine (FSM). This predefined sequence adopts a binary search-like methodology and includes a pass criterion of a successful register download. In embodiments, the register includes a mix of data, data complement, and a specific passcode. Advantageously, the proposed system allows for a quick zeroing in on the right reference, thereby enabling reliable memory downloads. Once the correct reference is zeroed in, the trim value is downloaded.

Figure 1:
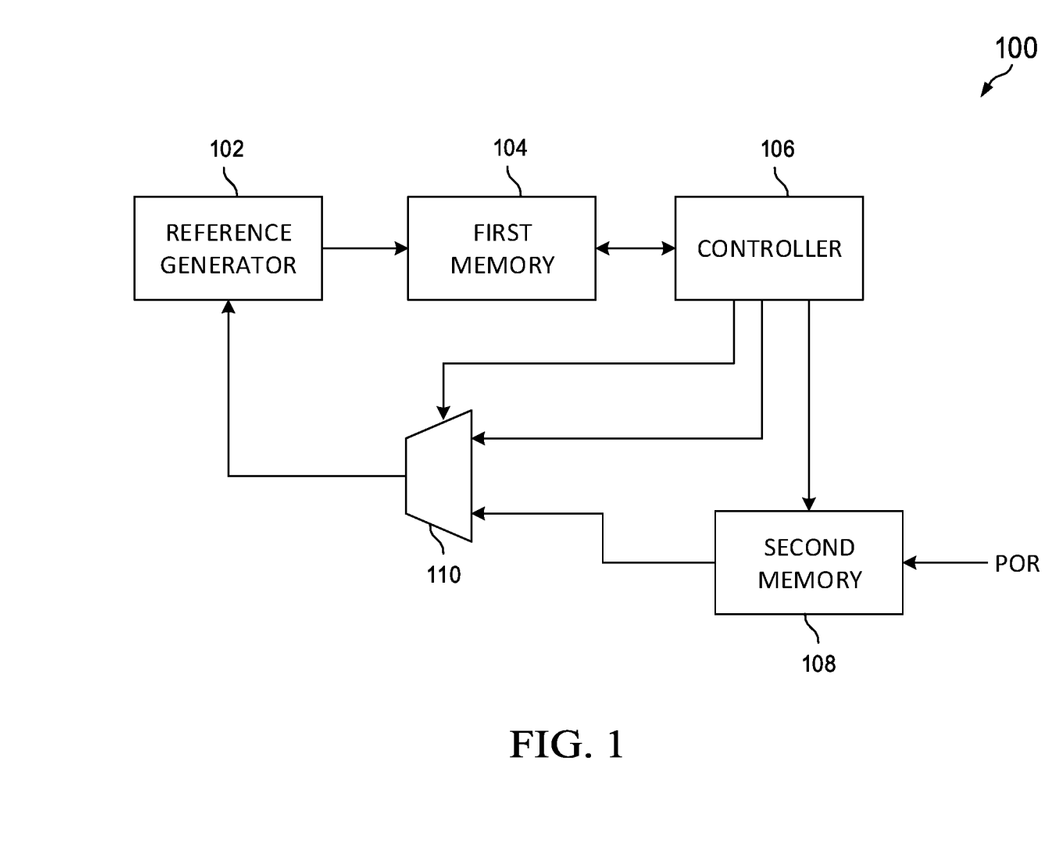
FIG. 1 is a block diagram of an embodiment system.

FIG. 1 illustrates a block diagram of an embodiment system 100. System 100 includes a reference generator 102, a first memory 104, a controller 106, a second memory 108, and a multiplexer 110, which may (or may not) be arranged as shown. System 100 may include additional components not shown, such as a processor coupled to the second memory 108. The processor can access the second memory 108 to execute instructions.

Reference generator 102 generates stable, known voltage or current quantities, generally unaffected by external factors such as temperature changes, input variations, power supply fluctuations, and aging. In embodiments, the reference generator 102 is configured to generate a stable reference current ($I_{REF}$) and reference voltage ($V_{REF}$) for the first memory 104 based on a trim value.

In embodiments, the reference generator 102 is configured to receive a trim value (analog or digital) from the multiplexer 110 as a form of feedback signal to dynamically adjust or trim the reference current ($I_{REF}$), the reference voltage ($V_{REF}$), or both values for the first memory 104. The trim value can indicate to the reference generator 102 the adjustments required to one or both of the values of the reference current ($I_{REF}$) and reference voltage ($V_{REF}$). The trim value may indicate to the reference generator 102 to adjust or trim one or both of the reference current ($I_{REF}$) and reference voltage ($V_{REF}$) values.

In embodiments, reference generator 102 is coupled to an external power source (not shown) within system 100 or coupled to system 100. In embodiments, reference generator 102 may include separate current and voltage generators. In embodiments, the reference generator 102 may include a localized controller or a logic circuit that receives the trim value and, based thereon, adjusts or trims the reference current ($I_{REF}$), the reference voltage ($V_{REF}$), or both.

In embodiments, reference generator 102 includes an adjustable voltage divider using, for example, variable resistors. The variable resistors can be adjusted based on the trim value to generate the reference voltage ($V_{REF}$) across various values. Other known methods to set the reference voltage ($V_{REF}$) based on a trim value are also contemplated in other embodiments.

In embodiments, reference generator 102 includes a transistor and a variable resistor as a transistor-resistor pair. The variable resistor can be adjusted based on the trim value to generate the desired reference current ($I_{REF}$) across a range of values. The transistor draws the necessary current to keep a constant output current. Other known methods to set the reference current ($I_{REF}$) based on a trim value are also contemplated in other embodiments.

In embodiments, the first memory 104 is a non-volatile memory (NVM). In embodiments, the first memory 104 is a one-time programmable (OTP) memory. In embodiments, the first memory 104 includes 96 bytes (i.e., 96×8 bits).

Non-volatile memory retains its stored data even after the power is switched off, which is particularly valuable for preserving data between different power cycles. It can store important information such as system configuration data, user settings, or other essential data that must persist after the system is powered down. One-time programmable memory, on the other hand, is a type of non-volatile memory that can only be programmed once. It is often used to store fixed data that does not need to change throughout the lifetime of a device. Examples of such data might include manufacturing information, encryption keys, device identifiers, firmware, or other information that must remain constant and secure.

Generally, the data from the first memory 104 are not used directly due to performance considerations. For faster data access, the data from the first memory 104 is downloaded or transferred to the second memory 108 when the system powers up or during specific operations.

In embodiments, the second memory 108 is local memory, which could be SRAM (Static Random-Access Memory) or DRAM (Dynamic Random-Access Memory). In embodiments, the second memory 108 includes 46 words of local memory (i.e., 46×16 bits). In embodiments, the second memory 108 is used to download values from the first memory 104. In embodiments, the second memory 108 stores trim values for various analog and digital functions of a device hosting the system 100.

The second memory 108 has much faster access times than the first memory 104. By transferring the data from the first memory 104 to the second memory 108, the processor of system 100 can read and write the data quickly, resulting in more efficient and faster operations. Once the data is no longer needed or the system powers down, the second memory 108 typically doesn't preserve this data.

Controller 106 is coupled to the first memory 104, the second memory 108, the multiplexer 110, and the reference generator through the multiplexer 110. In embodiments, controller 106 controls the operation of system 100 to download data from the first memory 104 to the second memory 108 by providing one or more temporary trim values to the reference generator 102 through the multiplexer 110. Once an acceptable temporary trim value is provided to the reference generator 102, a more accurate trim value stored in the first memory 104 is downloaded to the second memory 108. The controller 106 sets the selection signal to the multiplexer 110 such that the trim value provided to the reference generator 102 is provided by the more accurate trim value stored in the second memory 108. Once the reference generator 102 is trimmed based on the more accurate trim value, the contents of the first memory 104 are downloaded to the second memory 108.

Multiplexer 110 is configured to receive input signals from the second memory 108 and the controller 106. Controller 106 additionally provides the multiplexer 110 with a selection signal. The value of the selection signal determines which of the inputs to the multiplexer 110 is provided at its output, provided as the trim value to reference generator 102.

Figure 2:
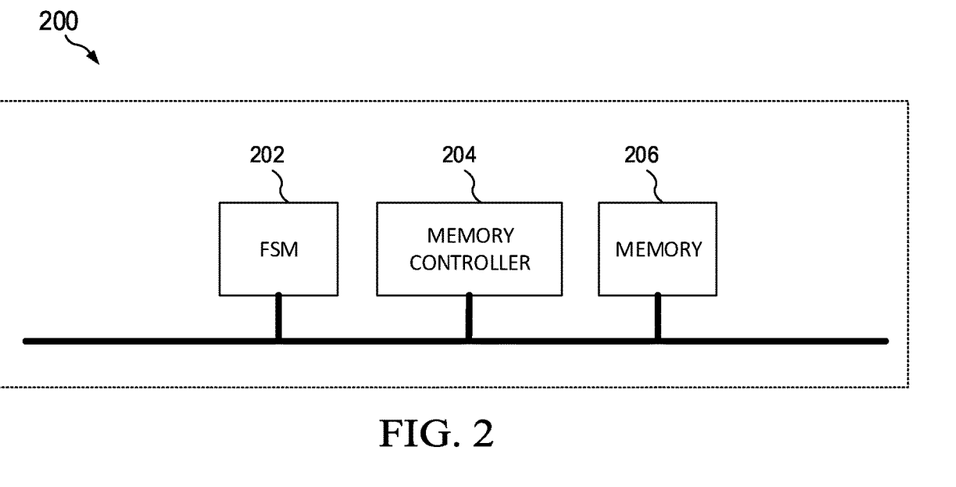
FIG. 2 is a block diagram of an embodiment controller, which may be implemented as a controller in the system of FIG. 1.

FIG. 2 illustrates a block diagram of an embodiment controller 200, which may be implemented as the controller 106 in FIG. 1. As shown, controller 200 includes a finite state machine (FSM) circuit 202, a memory controller 204, and an optional memory 206, which may (or may not) be arranged as shown. Controller 200 may include additional components not shown, such as an analog-to-digital (ADC) converter. In embodiments, controller 200 is a single package component within system 100. In embodiments, the functions and the structure of the controller 200 are implemented in a processor of a host device.

FSM circuit 202 is a digital circuit that implements a finite state machine, a mathematical model used to describe the behavior of the FSM circuit 202 that can exist in a finite number of states. FSM circuit 202 may include one or more state registers, state transition logic, and output logic, and be based on a state transition table or diagram.

FSM circuit 202 is designed to respond to input signals received from the first memory 104 and transition between different states based on predefined rules or conditions. In FSM circuit 202, the circuit's behavior is divided into discrete states, and the transitions between these states occur in response to inputs. The current state of the FSM (e.g., stored in a state register implemented as flip-flops or other types of sequential logic elements) is determined by the values stored in memory elements, such as flip-flops or registers, within the FSM circuit 202. The input signals and the current state together determine the next state of the system (e.g., using the state transition logic), as defined by a state transition table or state transition diagram—as further detailed below with respect to FIG. 7.

In embodiments, pre-defined trim values are hardcoded into the FSM circuit 202. In embodiments, each state of the FSM circuit 202 is associated with one of the pre-defined trim values. For example, if the FSM circuit 202 includes five states (non-limiting), the number of pre-defined trim values hardcoded into the FSM circuit 202 is also five. In embodiments, the pre-defined trim values hardcoded into the FSM circuit 202 are derived from analog simulation, during production, manufacturing, or various tests.

Memory controller 204 can be used for various computing or storage functions within the controller 200. For example, the memory controller 204 downloads data stored in the first memory 104 to second memory 108. In embodiments, the memory controller 204 downloads data stored in the first memory 104 to perform a download integrity check by the FSM circuit 202 (as detailed in step 612 below). In embodiments, the functions performed by memory controller 204 are implemented in a generic processor or a specific processor, such as a microcontroller.

In embodiments, memory 206 temporarily stores data used by controller 200 to perform, for example, a download integrity check by the FSM circuit 202 (as detailed in step 612 below). In embodiments, memory 210 may include elements like flip-flops, registers, or other storage elements. In embodiments, memory 206 stores the pre-defined trim values accessible by the FSM circuit 202. In embodiments, memory 206 temporarily instructions executable by the memory controller 204 to operate the system 100.

In embodiments, controller 200 includes one or more external pads to allow communication of signals with the first memory 104, the second memory 108, and the multiplexer 110 (or any other component within system 100).

Figure 3:
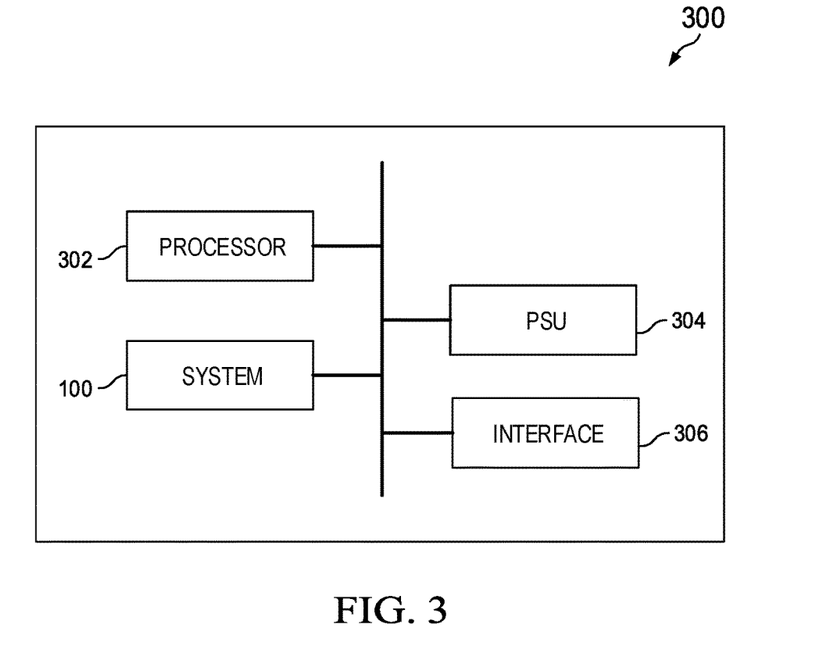
FIG. 3 is a block diagram of an embodiment device hosting the system of FIG. 1.

FIG. 3 illustrates a block diagram of an embodiment device 300 hosting the system 100. Device 300 includes system 100, a processor 302, a power supply unit (PSU) 304, and an interface 306, which may (or may not) be arranged as shown. Device 300 may include additional components not shown. Although one of each (i.e., the system 100, the processor 302, the power supply unit (PSU) 304, and the interface 306) is shown in FIG. 3, the number of components is not limiting, and greater numbers are similarly contemplated in other embodiments. Device 300 may include additional components not depicted, such as long-term storage (e.g., non-volatile memory, etc.), power management circuitry, security and encryption modules (e.g., trusted platform modules (TPM), etc.), or the like. Device 300 may be an electronic device, such as a smartphone, a tablet, a laptop, a smartwatch, a vehicle, or any system or sub-system capable of hosting the system 100.

In embodiments, each component can communicate with any other component internally within or external to the device 300. For example, each component can communicate using the I2C (alternatively known as I2C or IIC) communication protocol, the serial peripheral interface (SPI) specification, or the like.

Processor 302 may be any component or collection of components adapted to perform computations or other processing-related tasks. In embodiments, processor 302 is an application processor, a microcontroller, an application-specific integrated circuit (ASIC), or the like. In embodiments, processor 302 is in communication with the system 100. The first memory 104 in system 100 may be any component or collection of components adapted to store programming or instructions for execution by processor 302. In an embodiment, the first memory 104 includes a non-transitory computer-readable medium.

Power supply unit 304 may be any component or collection of components that supply power or control the supply of power to the device 300. In embodiments, the power supply unit 304 is coupled to the reference generator 102 as the external power supply. In embodiments, the reference generator generates the reference current ($I_{REF}$) and reference voltage ($V_{REF}$) values for system 100 using the current and voltage provided by the power supply unit 304 after power-up.

Interface 306 may be any component or collection of components that allow processor 302 to communicate with other devices/components or a user. For example, interface 306 may be adapted to allow users to interact/communicate with the device 300.

Figure 4:
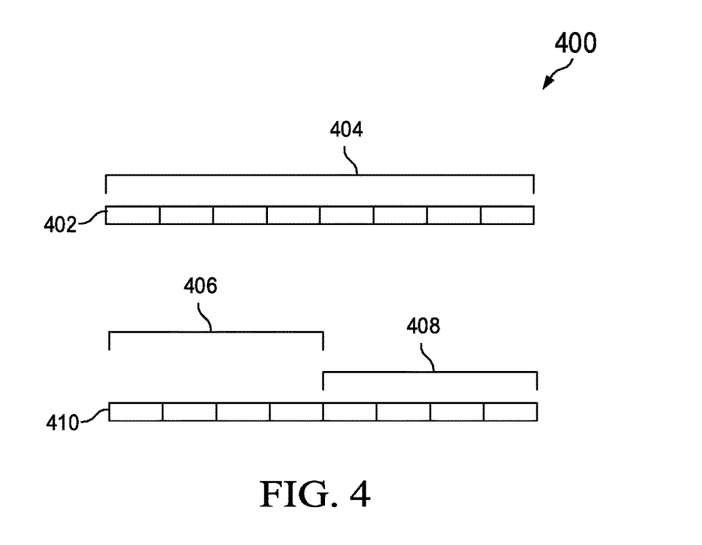
FIG. 4 shows registers of an embodiment memory, which may be implemented as a first memory in the system of FIG. 1.

FIG. 4 illustrates registers of an embodiment memory 400, which may be implemented as the first memory 104 in FIG. 1. As shown, the memory 400 includes a first register 402 and a second register 410, which may (or may not) be arranged as shown. Memory 400 may include additional registers not shown. The additional registers not shown may be used for purposes different than those described herein.

In embodiments, the first register 402 and the second register 410 are eight-bit registers. In embodiments, the first register 402 includes an eight-bit passkey stored in a first memory address 404. In embodiments, the passkey is a predefined combination of bits known to the FSM circuit 202. In embodiments, the predefined combination of bits known to FSM circuit 202 is hardcoded into the FSM circuit 202. In embodiments, the memory 206 may store the pre-defined combination of bits.

In embodiments, a four-bit trim value is stored in a second memory address 406. In embodiments, a four-bit inverted trim value is stored in a third memory address 408. The inverted trim value stored in the third memory address 408 is an inverted value of the trim value stored in the second memory address 406. An "inverted" trim value refers to the bitwise complement of the original four-bit trim value. Bitwise complement refers to flipping every bit in a binary representation (changing 1's to 0's and vice versa). Thus, the four-bit inverted trim value results from inverting each bit of the four-bit trim value through a binary operation.

For example, if a four-bit trim value is represented as 00001010 (which is 10 in decimal), its four-bit inverted trim value would be 11110101 (which is −11 in decimal—for signed integers with two's complement representation).

In embodiments, the trim value stored in the second memory address 406 is derived from analog simulation during production, manufacturing, or various tests. The trim value stored in the second memory address 406 is a precise value provided to the reference generator 102 after a successful download integrity check (see step 610 in FIG. 6).

The value of the trim value stored in the second memory address 406 depends on the trim value used to adjust or trim the reference current ($I_{REF}$), the reference voltage ($V_{REF}$), or both. Accordingly, embodiments of this disclosure initially utilize a set of pre-defined trim values that are, for example, hard-coded into the FSM circuit 202 to temporarily adjust or trim the reference current ($I_{REF}$), the reference voltage ($V_{REF}$), or both to an acceptable value or values.

In embodiments, to determine whether the temporary trim value is acceptable, the data stored in the first register 402, the second register 410, or both are downloaded, and a download integrity check is performed on the downloaded values.

In embodiments, in response to a successful download integrity check, the trim value of the reference generator 102 is adjusted or trimmed based on the trim value stored in the second memory address 406, which provides a more accurate adjustment to the reference current ($I_{REF}$), the reference voltage ($V_{REF}$), or both.

It is noted that the arrangement and size of the first register 402, the second register, the first memory address 404, the second memory address 406, and the third memory address 408 are non-limiting, and in embodiments, other arrangements and sizes are contemplated. For example, the inverted trim value may be stored in the first four bits of a third register (not shown).

Figure 5:
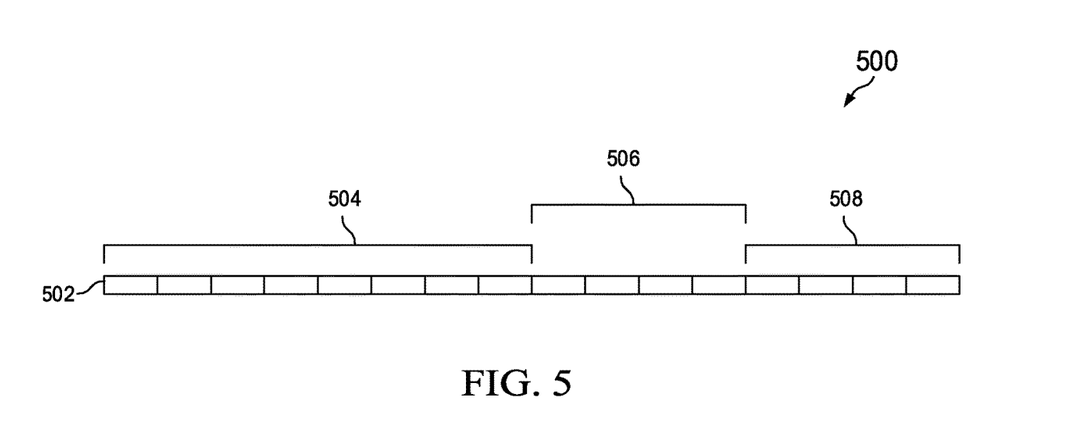
FIG. 5 shows a register of an embodiment memory, which may be implemented as a second memory in the system of FIG. 1.

FIG. 5 illustrates a register of an embodiment memory 500, which may be implemented as the second memory 108 in FIG. 1. As shown, memory 500 includes a first register 502, which may (or may not) be arranged as shown. Memory 500 may include additional registers not shown. The additional registers not shown may be used for purposes different than those described herein. For example, additional registers may be used as a check of a Cyclic Redundancy Check (CRC) after the download.

In embodiments, the first register 502, the second register 512, and the third register 522 are sixteen-bit registers (i.e., one-word length). In embodiments, a first memory address 504 of the first register 502 is reserved for the eight-bit passkey downloaded from the first memory address 404 of the first register 402 of memory 400. In embodiments, a second memory address 506 of the first register 502 is reserved for the four-bit trim value downloaded from the second memory address 406 of the second register 410 of memory 400. In embodiments, a third memory address 508 of the first register 502 is reserved for the four-bit inverted trim value downloaded from the third memory address 408 of the second register 410 of memory 400.

Figure 6:
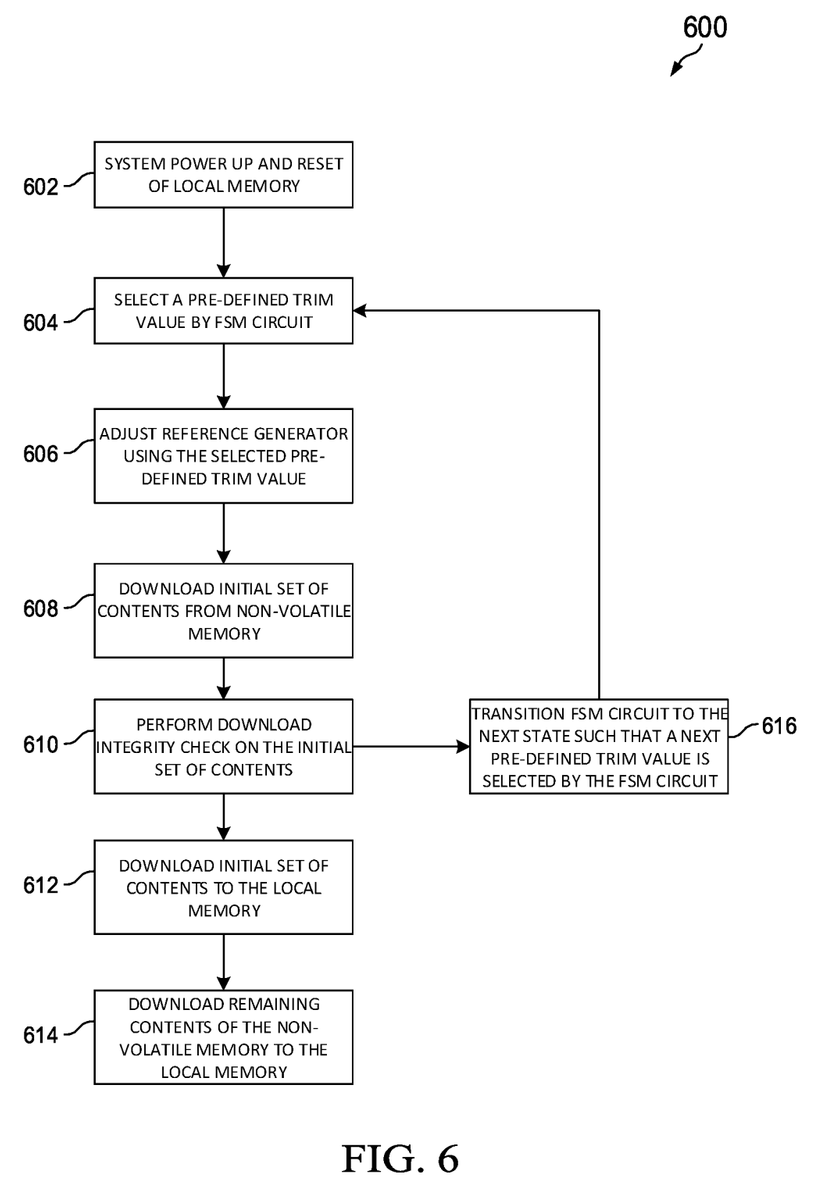
FIG. 6 is a flow chart of an embodiment method for operating the system of FIG. 1.

In embodiments, as described in detail concerning the flow chart of FIG. 6, in response to a successful download integrity check (see step 610 in FIG. 6), the passkey, the trim value, and the inverted trim value are downloaded from memory 400 to the first register 502 of memory 400, which are provided to the reference generator 102 to adjust or trim the reference current ($I_{REF}$), the reference voltage ($V_{REF}$), or both, such that data downloaded from the first memory 104 to the second memory 108 are accurate.

Figure 7:
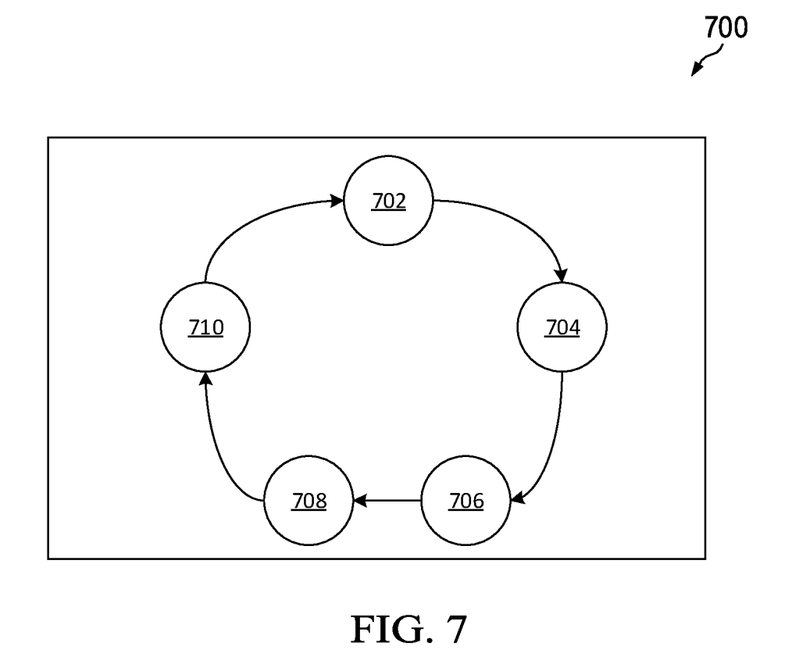
FIG. 7 is a state transition diagram of an exemplary finite state machine circuit (FSM), which may be implemented as an FSM circuit in the controller of FIG. 2.

FIG. 6 illustrates a flow chart of an embodiment method 600 for operating the system 100. FIG. 7 is a state transition diagram of an exemplary finite state machine circuit (FSM) 700, which may be implemented as the FSM circuit 202 in the controller 200. The operation of system 100 is described using method 600 in FIG. 6 and the state transition diagram in FIG. 7. It should be noted that although the FSM circuit 700 is shown with five states, a smaller or greater number of states are contemplated in other embodiments.

Method 600 provides an exemplary operational flow for system 100. Based on method 600, a temporary trim value is determined for the reference generator 102 that is, for example, hardcoded into the FSM circuit 202. Subsequently, a trim value stored in the first memory 104 that is more accurate to set the reference current ($I_{REF}$), the reference voltage ($V_{REF}$), or both is downloaded into the second memory 108 based on the temporary trim value set for the reference generator 102. The trim value from the second memory 108 is subsequently used to trim or adjust the reference generator, and the contents of the first memory 104 are downloaded to the second memory 108 based on the more accurate trimming of the reference generator 102.

In embodiments, the trim value may correspond to a trim value for the current generator and the voltage generator of the reference generator 102. In some embodiments, the trim value may correspond to a trim value for the current generator, for example, where the voltage generator has fewer variations across environmental changes. In other embodiments, the trim value may correspond to a trim value for the voltage generator, for example, where the current generator has fewer variations across environmental changes.

At step 602, device 300 is powered on. In embodiments, an analog power-on reset (POR) signal is generated upon power-up. In embodiments, FSM circuit 700, upon receiving the POR signal, waits until supervisor control signals indicate that device 300 is fully powered. In embodiments, the supervisor control signals include signals verifying the proper power-up sequence of the power supply unit 304. In embodiments, the registers in the second memory 108 are initialized (e.g., reset to default values) upon receiving the POR signal at startup. Once the device 300 is fully powered on, the FSM circuit 700 begins operation at the first state 702.

In embodiments, each flip-flop (i.e., registers in the second memory 108) is powered up with a default '0' or '1' when the POR signal is received at the second memory 108. For example, to initialize a flip-flop with a default startup value of '1', a set type flip-flop is used, and to initialize a flip-flop with a default startup value of '0', a reset type of flip-flop is used. Accordingly, the second memory 108 includes a set of initial values in case the pre-defined trim values from the FSM circuit 700 fail to provide a trim value that results in a successful download integrity check at step 610.

At step 604, FSM circuit 700, during the initial power-up, begins at first state 702 and selects (in order or randomly) a first pre-defined trim value from a list of pre-defined trim values. The pre-defined trim values are, for example, hardcoded into the FSM circuit 700 or stored in the memory 206 of controller 200.

If the pre-defined trim value, as discussed below, does not result in a successful download integrity check, the FSM circuit 700 transitions to a second state 704 at step 616. During a next cycle, FSM circuit 700, operating in the second state 704, selects (in order or randomly) a second pre-defined trim value from the list of pre-defined trim values not previously selected. The FSM circuit 700 at the end of step 616 cycles through the various states (e.g., third state 706, fourth state 708, and fifth state 710) sequentially if the download integrity check fails.

In embodiments, the FSM circuit 700 transitions through the various states (e.g., the five states shown in FIG. 7) until a successful download integrity check (see step 610) has been determined or each of the pre-defined trim values hardcoded into the FSM circuit 700 is trialed as trim values for the reference generator 102.

Once the FSM circuit 202 selects one of the pre-defined trim values based on the current state of the FSM circuit 202, the pre-defined trim value is provided to the reference generator 102 through the multiplexer 110. The selection signal provided to the multiplexer 110 is set to forward the pre-defined trim value from the FSM circuit 202 to reference generator 102 until a successful download integrity check (see step 610) has been determined. If a successful download integrity check (see step 610) is determined, the selection signal provided to the multiplexer 110 is set to forward the trim value stored in the second memory address 506 of the first register 502 to the reference generator 102 (see step 612).

At step 606, the reference generator 102 provides a reference current ($I_{REF}$) and a reference voltage ($V_{REF}$) for the first memory 104, which is adjusted or trimmed based on the pre-defined trim value received from FSM circuit 202.

At step 608, the values stored in the first register 402 of the first memory 104 are downloaded by controller 106 based on the reference current ($I_{REF}$) and reference voltage ($V_{REF}$), which is set based on the temporary trim value provided by the FSM circuit 202 to the reference generator 102 at step 604.

In embodiments, the values stored in the first register 402 of the first memory 104 are downloaded into the first register 502 of the second memory 108, based on the reference current ($I_{REF}$) and reference voltage ($V_{REF}$), which is set based on the temporary trim value provided by the FSM circuit 202 to the reference generator 102 at step 604.

At step 610, FSM circuit 202 performs a download integrity check. In an embodiment, the download integrity check includes checking whether the downloaded passkey from the first memory address 404 at the first register 402 of the first memory 104 equals the predefined combination of bits known to the FSM circuit 202. A download integrity check is successful if the downloaded passkey equals the value known to the FSM circuit 202. A download integrity check is unsuccessful if the downloaded passkey does not equal the value known to the FSM circuit 202.

In embodiments, the download integrity check includes checking whether the trim value downloaded from the second memory address 406 at the first register 402 of the first memory 104, when inverted, equals the value downloaded from the third memory address 408 at the first register 402 of the first memory 104. A download integrity check is successful if the trim value downloaded from the second memory address 406, when inverted, equals the inverted trim value downloaded from the third memory address 408. A download integrity check is unsuccessful if the trim value downloaded from the second memory address 406, when inverted, does not equal the inverted trim value downloaded from the third memory address 408.

In an embodiment, the download integrity check includes checking (i) whether the downloaded passkey from the first memory address 404 at the first register 402 of the first memory 104 equals the predefined combination of bits known to the FSM circuit 202 and (ii) whether the trim value downloaded from the second memory address 406 at the first register 402 of the first memory 104, when inverted, equals the value downloaded from the third memory address 408 at the first register 402 of the first memory 104. A download integrity check is successful if (i) the downloaded passkey equals the value known to the FSM circuit 202 and (ii) the trim value downloaded from the second memory address 406, when inverted, equals the inverted trim value downloaded from the third memory address 408. A download integrity check is unsuccessful if (i) the downloaded passkey does not equal the value known to the FSM circuit 202 or (ii) the trim value downloaded from the second memory address 406, when inverted, does not equal the inverted trim value downloaded from the third memory address 408.

In embodiments, the download integrity check may include fewer or greater checks.

At step 612, in response to the download integrity check at step 610 being successful, if not previously performed at step 608, the values stored in the first register 402 of the first memory 104 are downloaded into the first register 502 of the second memory 108, based on the reference current ($I_{REF}$) and reference voltage ($V_{REF}$), which is set based on the trim value provided by the FSM circuit 202 to the reference generator 102 at step 604.

In response to the successful download integrity check, the selection signal is set such that the multiplexer 110 forwards the trim value from the second memory address 506 of the first register 502 to reference generator 102. Thus, the reference generator 102 sets the reference current ($I_{REF}$) and reference voltage ($V_{REF}$) based on the trim value stored in the second memory address 506.

At step 614, the values stored in the first memory 104 are downloaded to the second memory 108 with the reference generator 102 set to the reference current ($I_{REF}$) and reference voltage ($V_{REF}$) based on the trim value as set at step 612.

At step 616, in response to the download integrity check at step 610 being unsuccessful, the operation returns to step 604, where the FSM circuit 202 transitions to a next state and provides a next pre-defined trim value to reference generator 102. If, however, the download integrity check at step 610 remains unsuccessful when the FSM circuit 202 cycles through the entire range of pre-defined trim values (i.e., transitions through the various states), the operation exits the flow chart and the registers in the second memory 108 remain at the initial value set in response to the POR signal during startup.

It is noted that not all steps outlined in the flow chart are necessarily required and can be optional. Further, changes to the arrangement of the steps, removal of one or more steps and path connections, and addition of steps and path connections are similarly contemplated.

A first aspect relates to a method that includes adjusting, by a controller, a reference generator into a first configuration, wherein, in the first configuration, the reference generator is configured to generate a first reference voltage and a first reference current for a first memory, the reference generator adjusted by a temporary trim value in the first configuration; performing, by the controller, a download integrity check on an initial set of data downloaded from the first memory based on the first reference voltage and the first reference current, the initial set of data comprising a first trim value; and downloading, by the controller, contents from the first memory into a second memory in response to a successful download integrity check after adjusting the reference generator into a second configuration, wherein, in the second configuration, the reference generator is configured to generate a second reference voltage and a second reference current for the first memory, the reference generator adjusted by the first trim value in response to a successful download integrity check.

In a first implementation form of the method according to the first aspect as such, the method further includes initializing the second memory to a default configuration in response to receiving a power on reset signal.

In a second implementation form of the method according to the first aspect as such or any preceding implementation form of the first aspect, the temporary trim value is a pre-defined trim value from a set of pre-defined trim values accessible to the controller.

In a third implementation form of the method according to the first aspect as such or any preceding implementation form of the first aspect, the method further includes transitioning a finite state machine (FSM) circuit of the controller from one state to a next in response to an unsuccessful download integrity check. In each state, the FSM circuit adjusts the reference generator based on a different temporary trim value.

In a fourth implementation form of the method according to the first aspect as such or any preceding implementation form of the first aspect, the first memory is a non-volatile memory and the second memory is a volatile memory.

In a fifth implementation form of the method according to the first aspect as such or any preceding implementation form of the first aspect, the initial set of data comprises a passkey, the first trim value, and an inverted first trim value. A successful download integrity check comprises verifying, by the controller, that the passkey matches a pre-determined value, that the inverted first trim value is an inverted value of the first trim value, or a combination thereof.

In a sixth implementation form of the method according to the first aspect as such or any preceding implementation form of the first aspect, the method further includes storing the first trim value in the second memory after determining a successful download integrity check; and adjusting the reference generator into the second configuration based on the first trim value stored in the second memory.

A second aspect relates to a circuit. The circuit includes a reference generator configured to generate a reference voltage and a reference current, wherein the reference voltage, the reference current, or both are adjustable based on a trim value; a first memory configured to store a first trim value for the reference generator in an initial set of data; a second memory; and a controller configured to: determine a temporary trim value to be forwarded to the reference generator; perform a download integrity check on the initial set of data downloaded from the first memory based on a first reference voltage and a first reference current provided by the reference generator after being adjusted based on the temporary trim value; and download a second set of data from the first memory to the second memory based on a second reference voltage and a second reference current provided by the reference generator after being adjusted based on the first trim value in response to a successful download integrity check.

In a first implementation form of the circuit according to the second aspect as such, the second memory is initialized to a default configuration in response to receiving a power on reset signal.

In a second implementation form of the circuit according to the second aspect as such or any preceding implementation form of the second aspect, the temporary trim value is a pre-defined trim value from a set of pre-defined trim values accessible to the controller.

In a third implementation form of the circuit according to the second aspect as such or any preceding implementation form of the second aspect, the controller includes a finite state machine (FSM) circuit. The FSM circuit is configured to transition from one state to a next in response to an unsuccessful download integrity check. In each state, the FSM circuit adjusts the reference generator based on a different temporary trim value.

In a fourth implementation form of the circuit according to the second aspect as such or any preceding implementation form of the second aspect, the first memory is a non-volatile memory and the second memory is a volatile memory.

In a fifth implementation form of the circuit according to the second aspect as such or any preceding implementation form of the second aspect, the initial set of data includes a passkey, the first trim value, and an inverted first trim value. A successful download integrity check includes verifying, by the controller, that the passkey matches a pre-determined value, that the inverted first trim value is an inverted value of the first trim value, or a combination thereof.

In a sixth implementation form of the circuit according to the second aspect as such or any preceding implementation form of the second aspect, the controller is further configured to download the first trim value to the second memory after determining a successful download integrity check. The reference generator is adjusted based on the first trim value stored in the second memory.

A third aspect relates to a device. The device includes a processor; and a circuit comprising: a reference generator configured to generate a reference voltage and a reference current, wherein the reference voltage, the reference current, or both are adjustable based on a trim value; a first memory configured to store a first trim value for the reference generator in an initial set of data; a second memory accessible by the processor; and a controller configured to: determine a temporary trim value to be forwarded to the reference generator; perform a download integrity check on the initial set of data downloaded from the first memory based on a first reference voltage and a first reference current provided by the reference generator after being adjusted based on the temporary trim value; and download a second set of data from the first memory to the second memory based on a second reference voltage and a second reference current provided by the reference generator after being adjusted based on the first trim value in response to a successful download integrity check.

In a first implementation form of the device according to the third aspect as such, the second memory is initialized to a default configuration in response to receiving a power on reset signal.

In a second implementation form of the device according to the third aspect as such or any preceding implementation form of the third aspect, the temporary trim value is a pre-defined trim value from a set of pre-defined trim values accessible to the controller.

In a third implementation form of the device according to the third aspect as such or any preceding implementation form of the third aspect, the controller includes a finite state machine (FSM) circuit configured to transition from one state to a next in response to an unsuccessful download integrity check. In each state, the FSM circuit adjusts the reference generator based on a different temporary trim value.

In a fourth implementation form of the device according to the third aspect as such or any preceding implementation form of the third aspect, the first memory is a non-volatile memory and the second memory is a volatile memory.

In a fifth implementation form of the device according to the third aspect as such or any preceding implementation form of the third aspect, the initial set of data includes a passkey, the first trim value, and an inverted first trim value. A successful download integrity check includes verifying, by the controller, that the passkey matches a pre-determined value, that the inverted first trim value is an inverted value of the first trim value, or a combination thereof.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:
   adjusting, by a controller, a reference generator into a first configuration, wherein, in the first configuration, the reference generator is configured to generate a first reference voltage and a first reference current for a first memory, the reference generator adjusted by a temporary trim value in the first configuration;
   performing, by the controller, a download integrity check on an initial set of data downloaded from the first memory based on the first reference voltage and the first reference current, the initial set of data comprising a first trim value; and
   downloading, by the controller, contents from the first memory into a second memory in response to a successful download integrity check after adjusting the reference generator into a second configuration, wherein, in the second configuration, the reference generator is configured to generate a second reference voltage and a second reference current for the first memory, the reference generator adjusted by the first trim value in response to a successful download integrity check.

2. The method of claim 1, further comprising initializing the second memory to a default configuration in response to receiving a power on reset signal.

3. The method of claim 1, wherein the temporary trim value is a pre-defined trim value from a set of pre-defined trim values accessible to the controller.

4. The method of claim 1, further comprising transitioning a finite state machine (FSM) circuit of the controller from one state to a next in response to an unsuccessful download integrity check, wherein, in each state, the FSM circuit adjusts the reference generator based on a different temporary trim value.

5. The method of claim 1, wherein the first memory is a non-volatile memory, and wherein the second memory is a volatile memory.

6. The method of claim 1, wherein the initial set of data comprises a passkey, the first trim value, an inverted first trim value, or a combination thereof, wherein a successful download integrity check comprises verifying, by the controller, that the passkey matches a pre-determined value, that the inverted first trim value is an inverted value of the first trim value, or a combination thereof.

7. The method of claim 1, further comprising:
   storing the first trim value in the second memory after determining a successful download integrity check; and
   adjusting the reference generator into the second configuration based on the first trim value stored in the second memory.

8. A circuit, comprising:
   a reference generator configured to generate a reference voltage and a reference current, wherein the reference voltage, the reference current, or both are adjustable based on a trim value;
   a first memory configured to store a first trim value for the reference generator in an initial set of data;
   a second memory; and
   a controller configured to:
      determine a temporary trim value to be forwarded to the reference generator;
      perform a download integrity check on the initial set of data downloaded from the first memory based on a first reference voltage and a first reference current provided by the reference generator after being adjusted based on the temporary trim value; and
      download a second set of data from the first memory to the second memory based on a second reference voltage and a second reference current provided by the reference generator after being adjusted based on the first trim value in response to a successful download integrity check.

9. The circuit of claim 8, where the second memory is initialized to a default configuration in response to receiving a power on reset signal.

10. The circuit of claim 8, wherein the temporary trim value is a pre-defined trim value from a set of pre-defined trim values accessible to the controller.

11. The circuit of claim 8, wherein the controller comprises a finite state machine (FSM) circuit, the FSM circuit configured to transition from one state to a next in response to an unsuccessful download integrity check, wherein, in each state, the FSM circuit adjusts the reference generator based on a different temporary trim value.

12. The circuit of claim 8, wherein the first memory is a non-volatile memory, and wherein the second memory is a volatile memory.

13. The circuit of claim 8, wherein the initial set of data comprises a passkey, the first trim value, an inverted first trim value, or a combination thereof, wherein a successful download integrity check comprises verifying, by the controller, that the passkey matches a pre-determined value, that the inverted first trim value is an inverted value of the first trim value, or a combination thereof.

14. The circuit of claim 8, wherein the controller is further configured to download the first trim value to the second memory after determining a successful download integrity check, and wherein the reference generator is adjusted based on the first trim value stored in the second memory.

15. A device, comprising:
   a processor; and
   a circuit, comprising:
      a reference generator configured to generate a reference voltage and a reference current, wherein the reference voltage, the reference current, or both are adjustable based on a trim value;
      a first memory configured to store a first trim value for the reference generator in an initial set of data;
      a second memory accessible by the processor; and
      a controller configured to:
         determine a temporary trim value to be forwarded to the reference generator;
         perform a download integrity check on the initial set of data downloaded from the first memory based on a first reference voltage and a first reference current provided by the reference generator after being adjusted based on the temporary trim value; and
         download a second set of data from the first memory to the second memory based on a second reference voltage and a second reference current provided by the reference generator after being adjusted based on the first trim value in response to a successful download integrity check.

16. The device of claim 15, where the second memory is initialized to a default configuration in response to receiving a power on reset signal.

17. The device of claim 15, wherein the temporary trim value is a pre-defined trim value from a set of pre-defined trim values accessible to the controller.

18. The device of claim 15, wherein the controller comprises a finite state machine (FSM) circuit, the FSM circuit configured to transition from one state to a next in response to an unsuccessful download integrity check, wherein, in each state, the FSM circuit adjusts the reference generator based on a different temporary trim value.

19. The device of claim 15, wherein the first memory is a non-volatile memory, and wherein the second memory is a volatile memory.

20. The device of claim 15, wherein the initial set of data comprises a passkey, the first trim value, an inverted first trim value, or a combination thereof, wherein a successful download integrity check comprises verifying, by the controller, that the passkey matches a pre-determined value, that the inverted first trim value is an inverted value of the first trim value, or a combination thereof.

* * * * *